United States Patent [19]

Coffey et al.

[11] Patent Number: 5,749,440

[45] Date of Patent: *May 12, 1998

[54] ARROW LUBRICANT CONTAINER-APPLICATOR SYSTEM

[75] Inventors: B. Howard Coffey, LaGrange; Gary L. Coffey, Glendale, both of Ky.

[73] Assignee: Coffey Marketing Corporation, LaGrange, Ky.

[*] Notice: The term of this patent shall not extend beyond the expiration date of Pat. Nos. 5,445,243 and 5,564,527.

[21] Appl. No.: 730,239

[22] Filed: Oct. 15, 1996

Related U.S. Application Data

[63] Continuation of Ser. No. 471,020, Jun. 6, 1995, Pat. No. 5,564,527, which is a continuation-in-part of Ser. No. 154,930, Nov. 19, 1993, Pat. No. 5,445,243.

[51] Int. Cl.⁶ ........................................ F01M 1/00
[52] U.S. Cl. .................. 184/102; 184/109; 220/229; 273/416; 206/315.11
[58] Field of Search ............................ 184/102, 109, 184/88.1, 88.2, 10, 14, 16, 19, 22, 25, 64; 220/229, 4.26, 4.27; 273/416, 419, 420; 118/100, 270; 224/148, 916; 206/315.11

[56] References Cited

U.S. PATENT DOCUMENTS

| | | | |
|---|---|---|---|
| 1,567,111 | 12/1925 | Burr | 184/109 |
| 5,293,960 | 3/1994 | Majerowicz et al. | 184/102 |
| 5,445,243 | 8/1995 | Coffey et al. | 184/102 |
| 5,564,527 | 10/1996 | Coffey et al. | 184/102 |

*Primary Examiner*—Christopher Verdier
*Attorney, Agent, or Firm*—David W. Carrithers

[57] ABSTRACT

A portable arrow lubricant container-applicator system for use in connection with sport bow shooting where arrows are shot into simulated target figures and where it is necessary to quickly and efficiently remove the arrows from the target figure without damage to the arrow tip or shaft and to minimize damage to the target figure. A lubricant container-applicator is provided for holding an absorbent medium which receives a liquid medium to prevent loss and spillage of the lubricant from the lubricant container-applicator. A septum type lid may be provided to allow insertion and removal of the arrow tip and shaft into the lubricating medium and for providing an arrangement for coating the arrow tip and shaft with the desired amount of lubricant. An insertion limiting device can be provided to adjust the length of the extent of insertion of the arrow into the lubrication medium. A guide arrangement such as a ribbed conical opening may be incorporated into the casing of the lubricant container-applicator to guide and center the arrow within the casing for application of the lubricant thereto. The present invention also incorporates an arrangement to removably hold a lubricant container-applicator in cooperative engagement with a bow, belt holding arrangement, and/or arrow quiver.

15 Claims, 9 Drawing Sheets

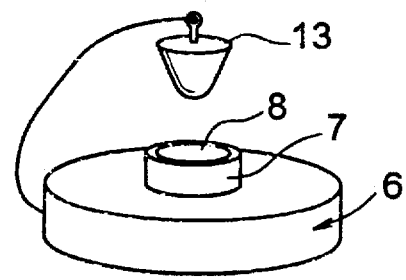
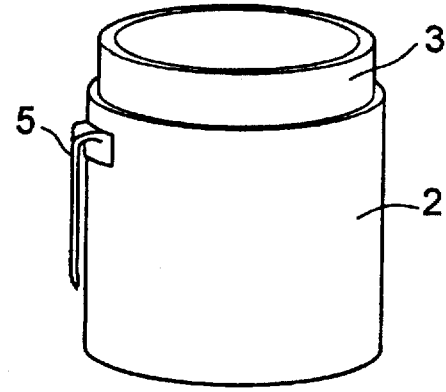
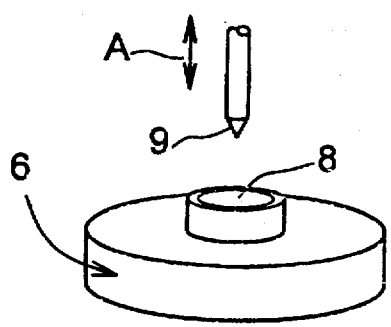
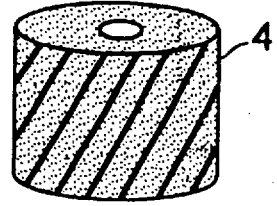
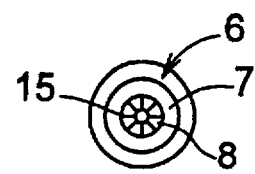
FIG. 1
FIG. 2
FIG. 3

ARROW LUBRICANT CONTAINER-APPLICATOR SYSTEM

This application is a Continuation of U.S. patent application Ser. No. 08/471,020, filed on Jun. 6, 1995, now U.S. Pat. No. 5,464,527, which is a Continuation in Part of U.S. patent application Ser. No. 08/154,930, filed on Nov. 19, 1993, now U.S. Pat. No. 5,445,243.

BACKGROUND OF THE INVENTION

The present invention relates to sport arrow lubricant container-applicator systems and particularly to a lubricant holder and lubrication means for easy and efficient lubrication of arrows prior to shooting.

Sport shooting has developed to the state where simulated target animals such as deer, bear, etc., are located in various areas and the shooter must seek out the animal and shoot at it from a specified area. The shooter's performance is then graded on the accuracy of his shot.

Arrows used in sport shooting are expensive and only few can be carried at one time so it is vital that the arrows be recovered from the simulated target animals undamaged and that damage to the target animals be minimized in the effort to remove the arrows therefrom. Even though the arrows are designed for easy release, the materials of construction of the simulated target animals generally hold the arrows securely. Thus, because of the cost of the target animals and other factors it is important that the arrows be recovered from the animals with as little damage to the simulated animal as possible. The simulated target animals must be sturdy to withstand numerous hits as well as the elements so the target animals are made of dense material which does not easily release the arrows.

It has been discovered that the use of lubricants such as glycol or other similar materials applied to the arrows immediately prior shooting facilitates release of the arrow without damage to the arrow or the simulated animal. Since the lubricant is most effective when applied immediately before shooting it is necessary for the shooter to carry a supply of the material in the field. The use of such lubricants has been complicated by the need for an effective means to carry a supply of the lubricant in a manner which it can be easily and quickly applied. Conventional apparatus currently available for carrying the lubricant and applying the material to the arrow is generally messy and slow. No effective means is known to be currently available for quick and easy field application of lubricant to arrows during a hunting session.

SUMMARY OF THE INVENTION

The present invention provides a new and novel means for lubricating arrows used for sport shooting at targets. While the principal use of devices within the scope of the present invention may be for use when shooting simulated animal targets, commonly called 3D target shooting, it is contemplated that devices within the scope of the present invention are also useful in lubrication of arrows for shooting other targets.

More particularly, the present invention encompasses a portable lubricant system for use in connection with sport bow shooting where arrows are shot into simulated target figures and where it is necessary to quickly and efficiently remove the arrows from the target figure without damage to the arrow tip or shaft and to minimize damage to the target figure. A lubricant container-applicator is provided for holding an absorbent medium which receives a liquid medium to prevent loss and spillage of the lubricant from the lubricant container-applicator. A septum type lid may be provided to allow insertion and removal of the arrow tip and shaft into the lubricating medium and for providing a means for coating the arrow tip and shaft with the desired amount of lubricant. An insertion limiting device can be provided to adjust the length of the extent of insertion of the arrow into the lubrication medium. A guide means such as a ribbed conical opening may be incorporated into the casing of the lubricant container-applicator to guide and center the arrow within the casing for application of the lubricant thereto.

Devices within the scope of the present invention are very effective and allow lubrication of an arrow immediately prior to shooting without requiring the shooter to break concentration. Likewise, devices within the scope of the present invention are versatile because of the means used to retain the lubricant in an enclosure so that the devices may be locate by a variety of means to suit the style of the shooter and so that the devices may be retained immovably within the enclosure for easy insertion and removal of the arrow.

Moreover, devices within the scope of the scope of the present invention can be economically fabricated so that they can be made available to the consumer at a reasonable cost.

More particularly, it is an object of the present invention to provide a portable lubricant system for use in connection with sport bow shooting where arrows are shot into targets such as simulated animal figures and where it is necessary to quickly and efficiently remove the arrows from the target without damage to the arrow and for minimizing damage to the target. A lubricant container-applicator is provided and holds an absorbent medium which receives the liquid lubricant to prevent loss of the liquid from the lubricant container-applicator. A septum type lid may be used to allow for insertion and removal of the tip and shaft of an arrow from the medium containing lubricant and minimize loss of excess lubricant. A limiting device can be provided to adjust the length of extent of insertion of the arrow shaft into the lubricant container-applicator. Lubricant container-applicator holding means are provided to secure the device onto a bow, on a belt, or for containment within a quiver.

Examples of arrangements within the scope of the present invention are illustrated in the accompanying drawings and described hereinafter but it will be understood that neither the accompanying illustrations not the descriptions thereof are by way of limitation and that other arrangements also within the scope of the present invention will occur to those skilled in the art upon reading the disclosure set forth hereinafter.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 1 is an exploded perspective view showing the lubricant container-applicator of the present invention;

FIG. 2 is an explored perspective view showing the insertion of an arrow tip and shaft into the top and absorbent medium of the invention of FIG. 1;

FIG. 3 is a top view of the lubricant container-applicator device of FIG. 1 showing the cover and septum therein;

DETAILED DESCRIPTION OF THE PREFERRED EMBODIMENT

Figure 4:
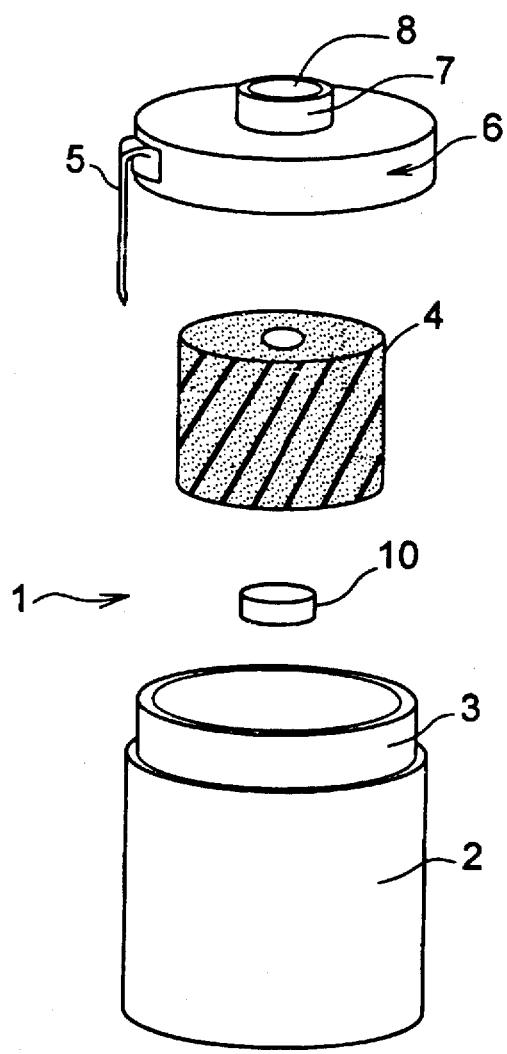
FIG. 4 is an exploded perspective view showing an alternate embodiment of FIG. 1 including a clip attached to the top.

FIGS. 1, 2 5, and 9 illustrate examples of a portable lubricant container-applicator system within the scope of the present invention for use in connection with sport bow shooting. For example, arrows are shot into simulated target figures and it is necessary to quickly and efficiently remove the arrows from the figure without damage to the arrow and to minimize damage to the target.

In FIG. 1, a portable lubricant container-applicator 1 having a casing 2 is provided and holds an absorbent medium 4 such as a fibrous or open cellular porous material such as sponge rubber which receives the liquid lubricant, for example glycol, silicon or other material. The medium 4 can be of selected size and usually will be sized to fit into the casing 2. The medium 4 is provided to prevent loss of the liquid from the casing 2 through spillage or by other means and allows generally unlimited movement without loss of the liquid from the casing 2 through spillage or by other means and allows generally unlimited movement without loss of the lubricant. As shown in the preferred embodiments, the absorbent medium 4 includes a hole therethrough slightly smaller than the diameter of an arrow shaft so that insertion and removal of the arrow tip 9 and arrow shaft through the absorbent medium 4 expands the absorbent medium and applies a thin layer of lubricant onto the arrow tip and shaft. The snug fit of the arrow tip and shaft within the absorbent medium provides a means for wiping excess lubricant from the arrow upon withdrawal from the absorbent medium. A lid 6 having a arrow tip guide ring 7 and optionally a cap 13 for cooperative engagement therein is provided which can be received on a cooperative inset lip 3 provided on casing 2. The lid 6 may fit in cooperative engagement with the inset lip 3 utilizing a friction fit, threaded cooperation, or a tongue and groove attachment. A flexible septum type cover 8 is may be provided to guide the arrow tip and shaft to allow for easy insertion and removal of the arrow into the adsorbent medium 4 and provide for further wiping and removal of excess lubricant from the arrow shaft and tip as best shown in FIGS. 3 and 5.

Figure 5:
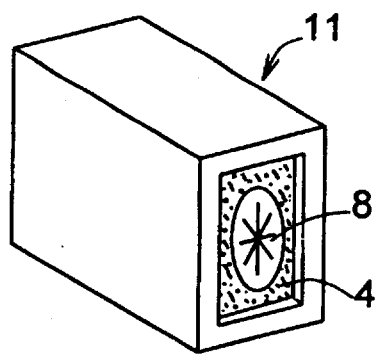
FIG. 5 is a perspective view of an alternate embodiment of the present invention adaptable for attachment to the bow of a shooter.

As shown in FIGS. 3 and 5, the septum cover 8 can be slit so that it provides adequate cover for the casing 2 to retain the liquid in the casing 2 and further the guide ring 7 forming a lip may work in cooperation with the a plurality of segments 15 formed in the septum 8 by splitting the flexible cover septum to wipe excess lubricant from the arrow tip 9 as it is removed from the casing 2.

In accordance with another optional feature of the present invention a spacer 10 can be provided to be located in the casing 2 and selected to limit the depth of insertion of the arrow 9 into the absorbent medium 4 of the casing 2 a distance depicted as "A" in FIG. 2. Since arrows have varying length tips the use of a proper spacer 10 can prevent or control and limit the portion of the arrow shaft in contact with the lubricant where such contact may not be desirable and further conserves lubricant.

Figure 7:
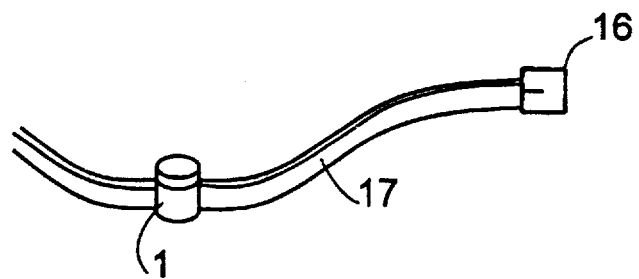
FIG. 7 is a perspective view of the present invention showing the lubricant container-applicator of FIG. 1 retained on a belt worn by the shooter.

FIG. 7 illustrates one means of carrying the lubricant container 1 where a belt 17 to be worn by the shooter has a fastening device such as a buckle 16 and the belt receives a lubricant container-applicator 1 similar to the lubricant container-applicator shown in FIGS. 1 and 4. The lubricant container-applicator 1 can be secured to the belt 17 by any convenient means such as shown in the example of FIGS. 1 and 4 where a belt clip 5 may be integrally formed with or attached to the cover 6 or casing 2 as shown. The clip 5 is shown as a part of the lid 6 or casing 2 but it will be understood that within the scope of the present invention other arrangements can be used equally well for removably securing the lubricant container-applicator 1.

Figure 8:
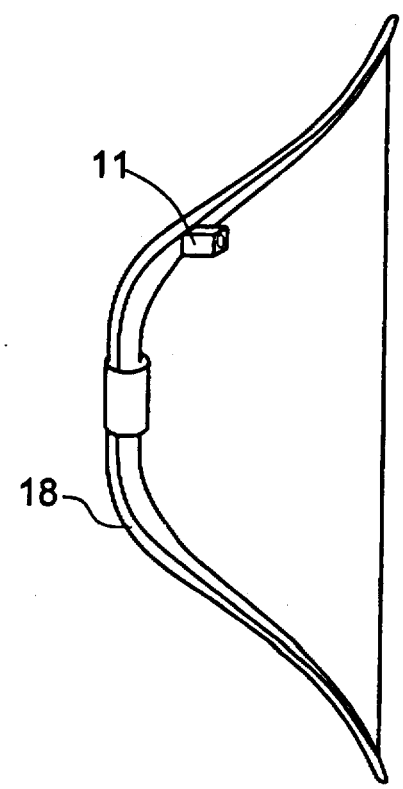
FIG. 8 is a perspective view showing the lubricant container-applicator of FIG. 5 secured to a bow of the shooter.
Figure 9:
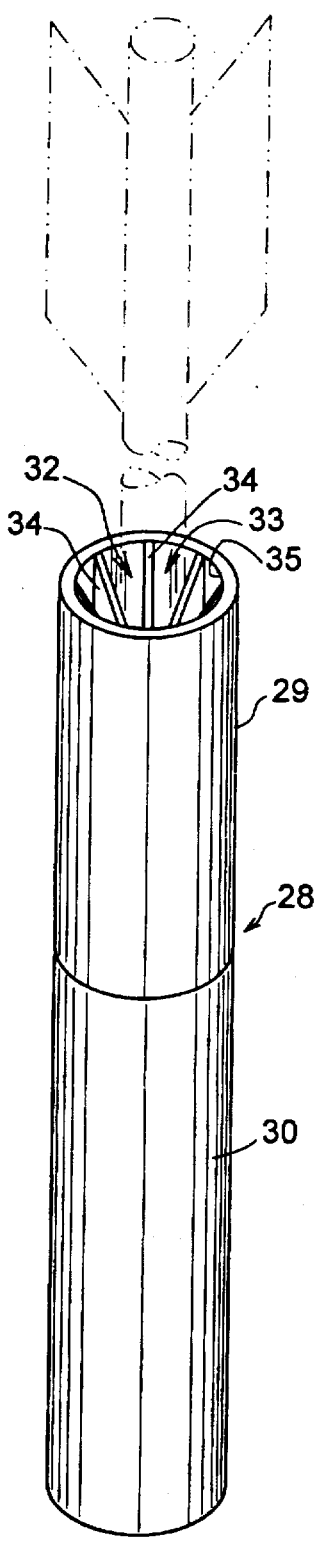
FIG. 9 is a perspective view of an embodiment of the present invention showing insertion of an arrow, (shown in phantom lines), disposed within a two piece lubricant container-applicator and guide ribs disposed within the top section having a conical shape near the opening for guiding the arrow tip therethrough.
Figure 11:
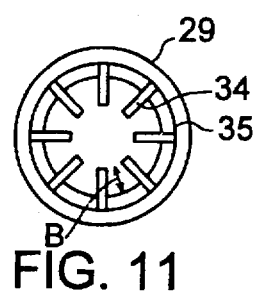
FIG. 11 is a top view of the embodiment of FIG. 9 showing the ribs therethrough.

FIGS. 5 and 8 illustrate yet another example of an arrangement within the scope of the present invention where a lubricant container-applicator casing 11 is provided with an open end covered by a flexible septum like cover 8 such as described with reference to FIGS. 1, 3 and 4. The examples show that the size of the container-applicator 11 may be fabricated to be made smaller than the lubricant container-applicator casing 2 shown in FIGS. 1 and 4 for wearing on a belt 17, and in fact can be made small enough to be secured to the bow 18 itself above the grip as shown in FIG. 8 where the lubricant container-applicator casing 11 of the type shown in FIG. 5 is attached to the bow 21. The exterior shape may be cylindrical or generally square and even provide a means of sighting. Of course, an absorbent medium 4 having a preformed hole therethrough and containing lubricant is provided within the casing 2. Again the septum cover 8 can be slitted forming segments 15 to facilitate insertion and withdrawal of the arrow and to apply and remove excess lubricant from the arrow by the wiping action of the absorbent material 4 and/or in combination with the septum segments 15.

Figure 6:
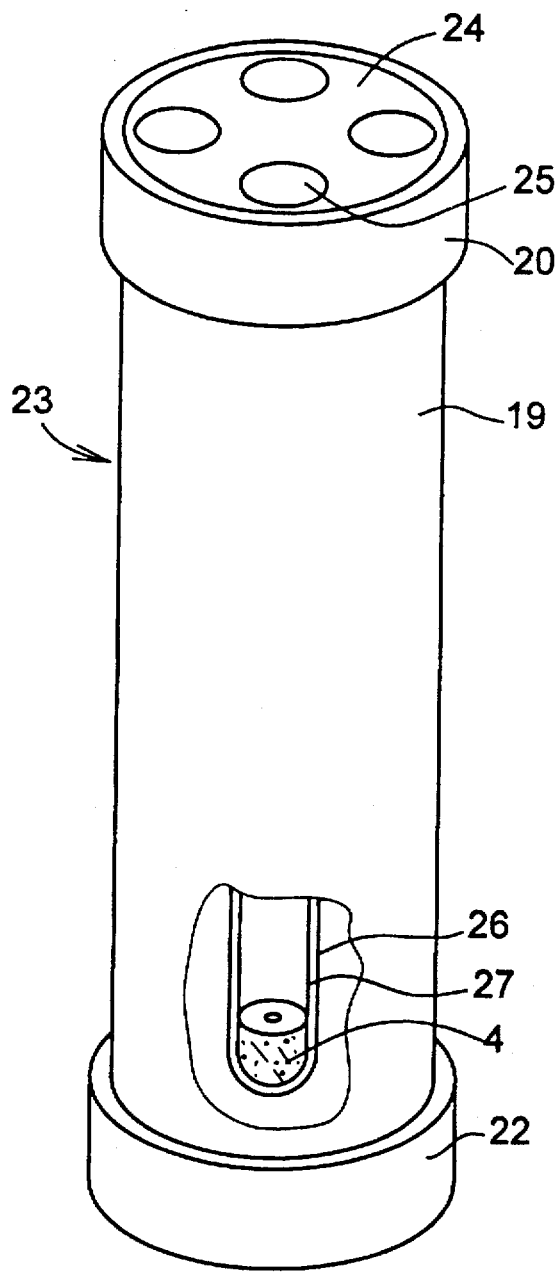
FIG. 6 is a perspective cut-away view showing an embodiment of the present invention removably retained within a tube of a quiver.

FIG. 6 illustrates yet another example of an arrangement within the scope of the present invention where an arrow quiver 23 is shown having a generally cylindrical central section 19 connecting a top end section 20 and bottom end section 22. The top end section 20 includes a plurality of cover 24 including a plurality of openings 25. Each of the openings 25 receives a closed end tube 26 for receiving an arrow. Within the scope of the present invention lubricant can be provided within the tube by insertion of a lubricant container-applicator casing 27 containing an absorbent medium 4 having a preformed hole therethrough and containing a lubricant of the typed previously described. The absorbent medium 4 having a preformed hole therethrough serves as and applicator and wiping means to distribute the lubricant onto the arrow tip and shaft upon insertion into the container-applicator 27. Again a septum cover 8 can be removably attached to the top of the container-applicator casing 27 and slitted forming segments 15 to facilitate insertion and withdrawal of the arrow and to apply and remove excess lubricant from the arrow by the wiping action of the absorbent material 4 and/or in combination with the septum segments 15.

Figure 10:
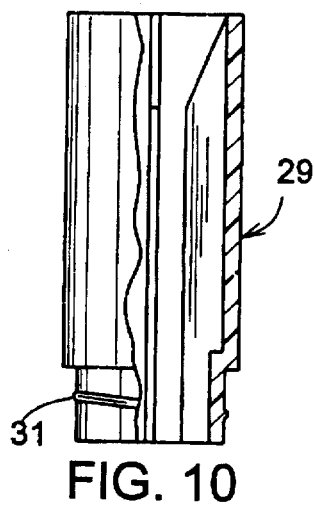
FIG. 10 is a perspective cut-away view of the embodiment of FIG. 9, showing the guide ribs therein and threaded portion of the top section.
Figure 12:
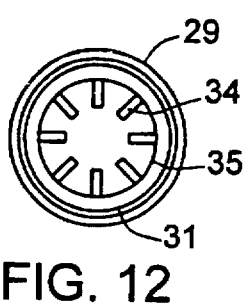
FIG. 12 is a bottom view of the embodiment of FIG. 9 showing the ribs therethrough.
Figure 14:
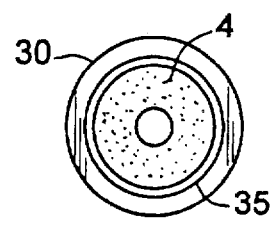
FIG. 14 is a top view of the embodiment of FIG. 9 showing the absorbent medium formed having an arrow shaft hole therethrough.
Figure 13:
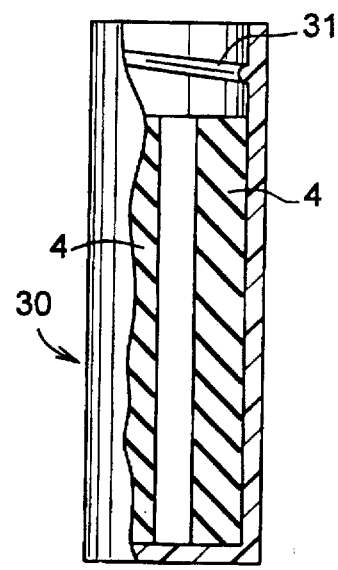
FIG. 13 is a perspective cut-away view of the embodiment of FIG. 9, showing the absorbent medium therein and threaded portion of the bottom section for cooperative engagement with the threaded portion of the top section.
Figure 15:
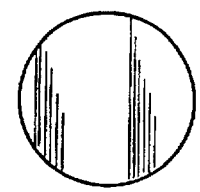
FIG. 15 is a bottom view of the embodiment of FIG. 9.
Figure 16:
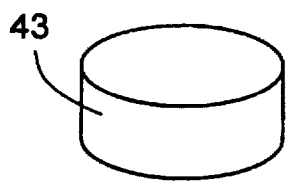
FIG. 16 is a perspective view showing a cap.
Figure 17:
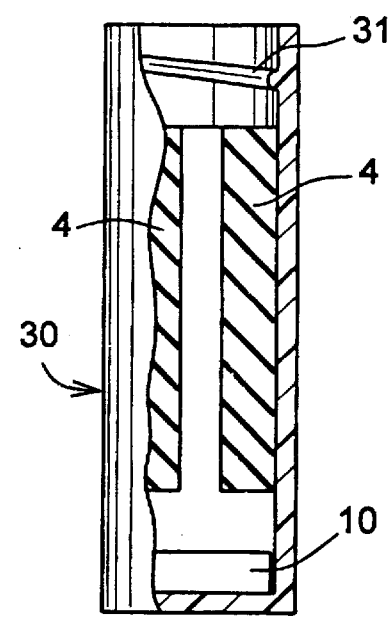
FIG. 17 is a perspective cut-away view of the embodiment of FIG. 9, showing the bottom section including absorbent medium space apart from the bottom, and including a spacer.

More particularly, FIGS. 9–17 shows a lubricant container-applicator 1 comprising a lubricant container-applicator 28, preferably formed in the shape of a cylindrical tube. The container-applicator 28, as shown, includes a top tubular casing 29 and a bottom tubular casing 30 removably connected by threaded connection 31, best shown in FIGS. 10 and 13, or by friction means (not shown). In the preferred embodiment, the top tubular casing 29 includes a guide means 32, such as a conical shaped opening 33 defined by a plurality of spaced apart ribs 34 extending radially inward from the inner wall 35 of the top portion 29 toward the center a selected distance "B" as best shown in FIG. 10. The ribs 34 serve to slidably guide the arrow tip and shaft for insertion into the lubrication medium 4 contained within the bottom tubular casing 30. As described heretofore, the absorbent medium 4 preferably is formed having a hole therethrough for applying to the arrow shaft and wiping excess lubricant from the shaft. The container-applicator 28 may also contain an optional spacer means 10 in the bottom portion 30 of the container-applicator 28. Furthermore the top the ribs 34 may be tapered outwardly at the top forming a conical guide means or funnel 36 to aid insertion of the arrow tip into the top portion 29.

A guide ring or septum, not shown, may be used as an alternate means of guiding the arrow tip and shaft into the tube 29 and providing a means of removal of excess lubricant. A cover 43 or cap may also be included to cover the top of the tube so that the tube 28 may be carried and used by itself or the cap may be removed for insertion of the tube 28 into a quiver tube 26. The two piece container-applicator 28 provides a method of refilling and changing the absorbent media whenever necessary; however, it is contemplated that one-piece container-applicators could be molded and the absorbent medium 4 and lubricant could be added to the casing through the top open end.

Figure 18:
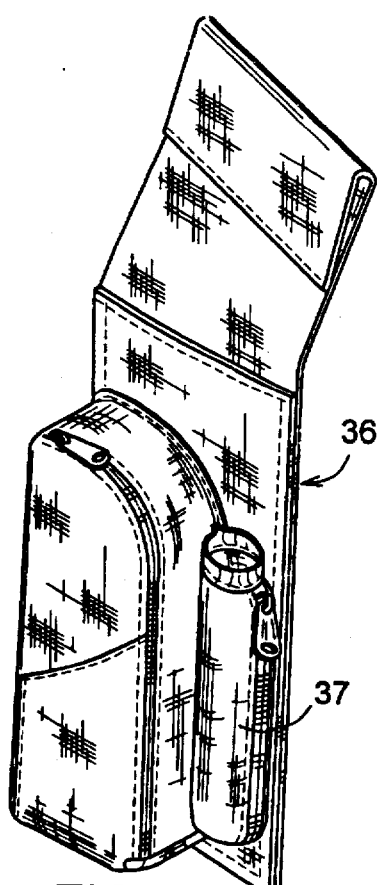
FIG. 18 is a perspective view showing the embodiment of FIG. 9 removably retained within a pocket formed in a first quiver embodiment.
Figure 19:
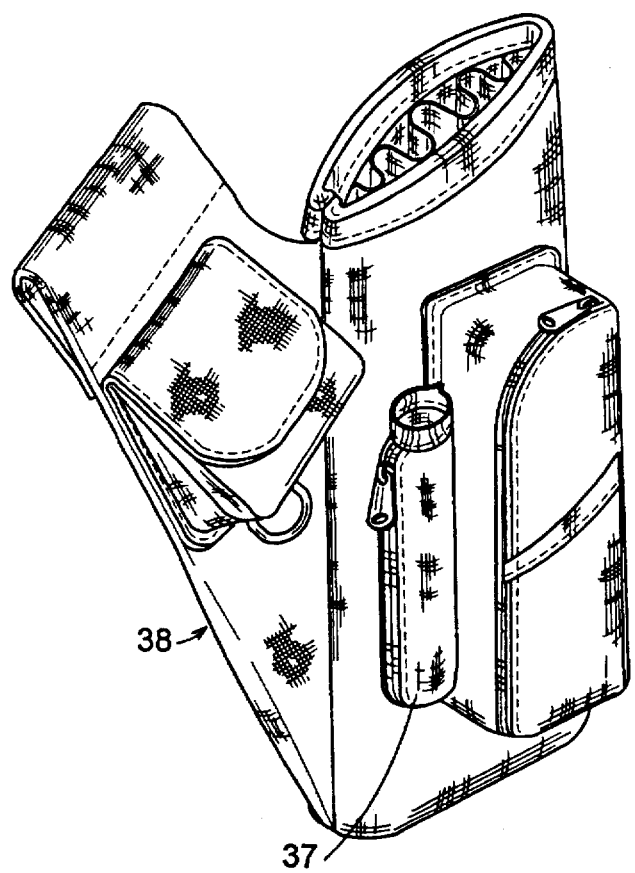
FIG. 19 is a perspective view showing the embodiment of FIG. 9 removably retained within a pocket formed in a second quiver embodiment.

FIGS. 18–23 show a means of retaining a lubricant container-applicator casing 27 and 28 such as described heretofore. FIG. 18 shows a first archery carrying device 36 incorporating a container-applicator holding device 37 for carrying a lubricant container-applicator casing 27 or 28 and FIGS. 19–23 show a quiver 38 incorporating the holding device 37 for carrying a container-applicator casing 27 or 28 such as shown and described herein.

Figure 20:
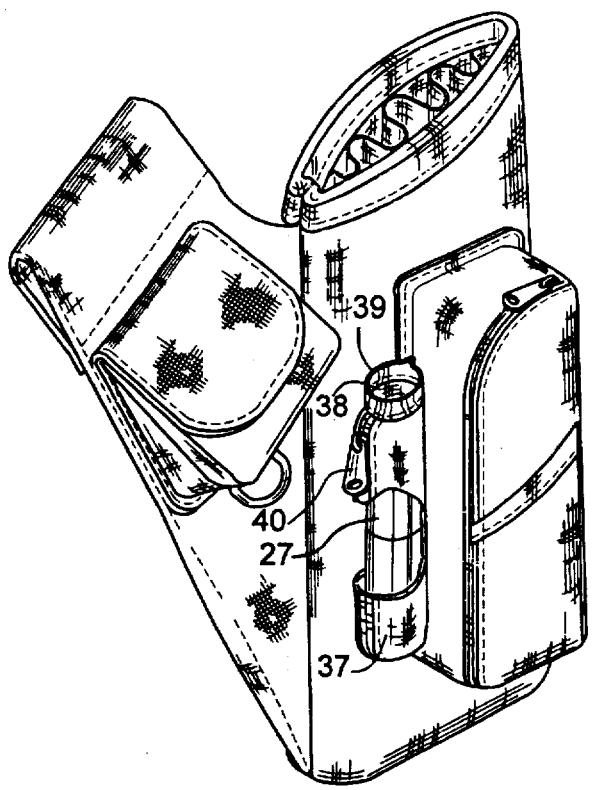
FIG. 20 is a perspective view showing the embodiment of FIG. 9 removably retained within a zippered pocket formed having elastic retaining means around the top of the pocket integrally formed in a first quiver embodiment.
Figure 21:
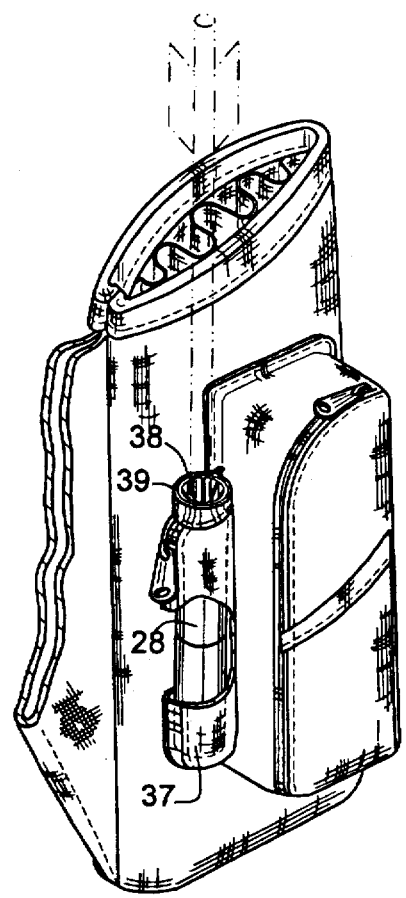
FIG. 21 is a perspective view showing the embodiment of FIG. 9 removably retained within a pocket formed having an elastic retaining means around the top of the pocket integrally formed in a second quiver embodiment and an arrow drawn in phantom lines inserted therein.
Figure 22:
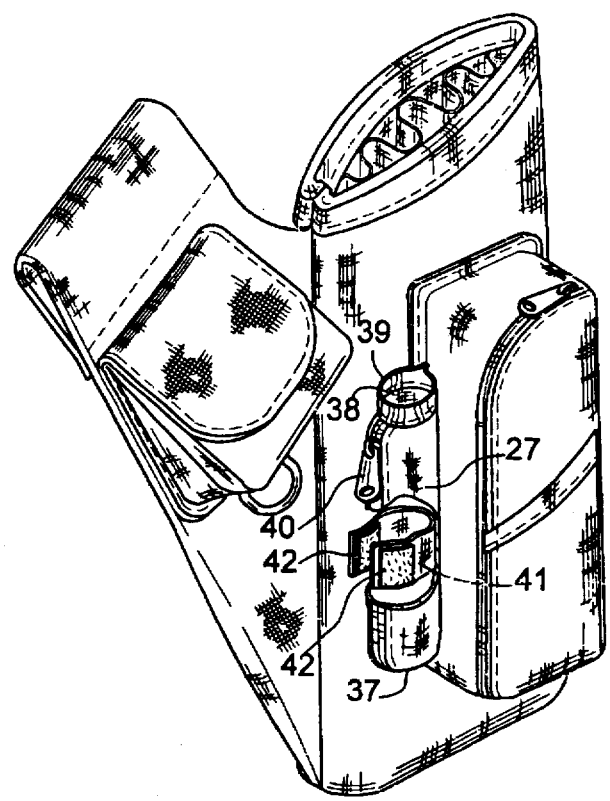
FIG. 22 is a perspective view showing the embodiment of FIG. 9 removably retained within a zippered pocket formed having elastic retaining means around the top of the pocket integrally formed in a first quiver embodiment and an interior retaining means such as a velcro strap for immovably securing the lubricant container-applicator.
Figure 23:
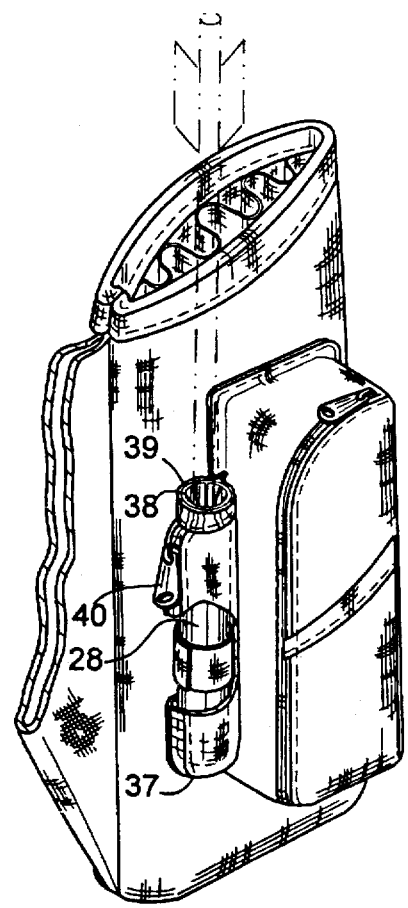
FIG. 23 is a perspective view showing the embodiment of FIG. 9 removably retained within a pocket formed having an elastic retaining means around the top of the pocket integrally formed in a second quiver embodiment and an arrow shown drawn in phantom lines inserted therein and an interior retaining means such as velcro strap attached within the pocket for immovably securing the lubricant container-applicator.

As shown in FIGS. 20 and 21, the holding device 37 includes an opening 38 having a restricted diameter forming a neck 39 for retaining the container-applicator case 27, 28 when the arrow is removed therefrom. The neck 39 may contain elastic for removal and retainment of the container-applicator casing 27, 28 in the holding device 37 such as shown in FIG. 21, and/or the holding device may utilize a zipper 40 for ease of replacing the container-applicator casing 27, 28 such as shown in FIG. 20 or a combination of features. Furthermore, an interior means 41 for retaining the container-applicator 27, 28 within the holding device 37 may be incorporated with the zipper 41 and/or elastic neck 39 arrangement to provide optimal securement of the container-applicator 27, 28 within the holding device 37 such as shown in FIGS. 21 and 22 by the use of velcro straps 42 sewn therein.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

We claim:

1. An arrow lubricant container-applicator for lubrication of an arrow tip comprising a tubular casing having an open top end and an absorbent medium selectively positioned therein, said absorbent medium providing means for receiving and cooperatively engaging said arrow tip, and a liquid lubricant received by said absorbent medium for lubricating said arrow tip which touches said absorbent medium.

2. The arrow lubricant container-applicator of claim 1, including a spacer means for limiting the distance said arrow tip is inserted into said absorbent medium.

3. The arrow lubricant container-applicator of claim 1, wherein said absorbent medium extends the entire length of said casing and has a longitudinal depth sufficient to cover said arrow tip and at least a portion of an arrow shaft.

4. The arrow lubricant container-applicator of claim 1, including a top for covering said open top end of said tubular casing.

5. The arrow lubricant container-applicator of claim 1, wherein said absorbent medium providing means for receiving and cooperatively engaging said arrow tip defines a cross-sectional area sized for cooperative engagement of said arrow tip.

6. The arrow lubricant container-applicator of claim 1, wherein said absorbent medium is flexible.

7. The arrow lubricant container-applicator for claim 1, wherein said absorbent medium is compressible.

8. The arrow lubricant container-applicator of claim 1, wherein inserting said arrow tip into said absorbent medium forms an opening therein.

9. The arrow lubricant container-applicator of claim 1, including means for guiding said arrow into said tubular casing extending a selected distance radially inward of said casing toward the center of said casing from an interior side wall of said casing.

10. The arrow lubricant container-applicator of claim 9, wherein said means for guiding said arrow into said tubular casing comprises a plurality of ribs.

11. The arrow lubricant container-applicator of claim 10, wherein said ribs are angled inwardly of said casing forming a cone.

12. The arrow lubricant container-applicator of claim 10, wherein said ribs provide a longitudinal opening in the center of said casing at least as great as the diameter of said arrow shaft.

13. The arrow lubricant container-applicator of claim 10, wherein said ribs extend longitudinally the entire length of said tubular casing.

14. The arrow lubricant container-applicator of claim 1, wherein said absorbent medium is a foam rubber.

15. The arrow lubricant container-applicator of claim 1, wherein said means for receiving and cooperatively engaging said arrow tip extends a longitudinal depth sufficient to cover at least a portion of an arrow shaft.

* * * * *